United States Patent [19]

Angel et al.

[11] 3,921,066

[45] Nov. 18, 1975

[54] BLOOD TEST DEVICE AND METHOD

[75] Inventors: Henry Robert Angel; James William Hennessy, both of Trumbull, Conn.

[73] Assignee: Angel Engineering Corporation, Stratford, Conn.

[22] Filed: Feb. 25, 1974

[21] Appl. No.: 445,123

[52] U.S. Cl................................ 324/71 CP; 356/40
[51] Int. Cl.$^2$.................. G01N 27/00; G01N 33/16
[58] Field of Search ........... 324/71 CP; 356/40, 206

[56] References Cited
UNITED STATES PATENTS

| | | | |
|---|---|---|---|
| 2,080,613 | 5/1937 | Lange | 356/206 |
| 3,271,671 | 9/1966 | Coulter | 324/71 CP |
| 3,453,438 | 7/1969 | Ban et al. | 324/71 CP |
| 3,549,994 | 12/1970 | Rothermel et al. | 324/71 CP |
| 3,577,162 | 5/1971 | Gaehviller | 324/71 CP X |
| 3,614,607 | 10/1971 | Schoen | 324/71 CP |
| 3,654,551 | 4/1972 | Flinchbaugh | 324/71 CP |
| 3,657,725 | 4/1972 | Estelle et al. | 324/71 CP X |
| 3,743,424 | 7/1973 | Coulter | 324/71 CP X |
| 3,768,084 | 10/1973 | Haynes | 324/71 CP |

*Primary Examiner*—Alfred E. Smith
*Assistant Examiner*—Rolf Hille
*Attorney, Agent, or Firm*—Dorfman, Herrell and Skillman

[57] ABSTRACT

A conductivity cell comprised of insulating material which is vertically oriented with a metering orifice near its bottom in its sidewall is arranged to draw particle containing conductive fluid (such as electrolyte-diluted blood) through the orifice into the core of the cell by vacuum pump. Electrodes, inside and outside the core respectively, measure voltage, and pulses occurring as particles pass through the orifice are recorded as a count of the particles. The internal counting electrode is grounded and used with two electrodes at successive levels to define a predetermined volume of solution between the bottoms of the respective electrodes such that counts are recorded only when the level of the fluid lies between the electrodes. The count is initiated when fluid level rises to the lower electrode and terminated when it reaches the upper electrode. A constant current source is preferably employed between ground and the external electrode with the internal electrode grounded and voltage is sensed anywhere between the external electrode and the current source. The respective electrodes are used to control a control circuit which enables counting only while fluid is rising between the electrodes which measures a predetermined volume of fluid. Display of the selected kind of count being made occurs by translation of the actual count made into signal bits which will cause the display to indicate a count per unit volume. The same display may be used to show hemoglobin based on a critical frequency light transmission comparison between light passed through a sample and light directly measured compared on a bridge.

14 Claims, 4 Drawing Figures

BLOOD TEST DEVICE AND METHOD

In the past 20 years significant advances have been made in the field of electronic particle counting. Some applications of the principles include blood cell counting, bacteria counting, sperm counting, and other biological cell counts as well as various industrial particle counting uses and particle counting in the milk products field. Heretofore the devices manufactured have been limited for the most part to uses in hospitals, clinical labs and other labs where relative high costs were not necessarily prohibitive to use. The present invention permits the manufacture of reliable and accurate equipment for considerably less cost than has been possible in the past and brings the cost of such equipment to a level which is acceptable to cost conscious users such as the private practicing physician and the small medical or clinical labs.

One of the main applications of the invention is in the measurement of common blood cell parameters. In particular the measurements of Red Blood Count (RBC), White Blood Count (WBC) and Hemoglobin (HGB) are intended. The determination of other common blood cell parameters are facilitated by use of an auxilliary centrifuge to measure Hematocrit, (the ratio of the packed cell volume to the total volume of the blood sample), and a simple look up table which may be incorporated into a slide-rule-type of calculator to calculate the Mean Cell Volume (MCV), Mean Cell Hemoglobin (MCH), and Mean Cell Hemoglobin Concentration (MCHC). The system and apparatus of the invention provides a simple and inexpensive means of making the Red Blood Count, the White Blood Count and the Hemoglobin determination.

In part the invention makes use of the well known principle of cell detection using the inherent differences in conductivity between the cells and a conducting solution in which the cells are suspended. To facilitate the detection the cells in suspension are caused to pass through a narrow restriction or orifice. An electrode is located on each side of the orifice in the solution whereby an electrical current in the solution must flow through the orifice. Because the cells are relatively non-conductors in the conducting solution, as they pass through the orifice the cells materially reduce conductivity within the orifice and cause a momentary change of impedance between the two electrodes. This impedance change with the proper electronic discrimination means permits detection of each cell passing through the orifice as a pulse. This principle described in U.S. Pat. No. 2,656,508 is commonly called the Coulter principle.

In a preferred version of the invention it is desirable to measure the cell counts by detecting and displaying the total number of cells in a predetermined volume of the whole blood sample. Dilution of the blood sample with saline solution or other conductors has been practiced in the past to improve blood conductivity. By proper selections of the dilution ratio of the blood sample and the diluting solution and by counting the cells in a predetermined volume of the suspension, the displayed result can represent the number of cells per cubic millimeter of whole blood, a common manner of representing the blood count. Because of the greater density of Red cells in whole blood than White cells it is preferred to select the dilutions such that a double dilution is made for the Red cell count whereas a single dilution is made for the White cell count. For example, the following practical dilution ratio can be used:

$$\frac{1 \text{ part blood}}{400 \text{ parts diluent}} \cdot \frac{1 \text{ part of 1st dilution}}{400 \text{ parts diluent}} = \frac{1}{160,000}$$

1st dilution (used for White cell count)  2nd dilution (used for Red cell count)

When using the first dilution for the White cell count it is necessary to eliminate the Red cells from entering into the measured result. This is accomplished chemically by a stromalytic agent or lysing agent. This lysing agent serves the function of dissolving the outer membrane of the red cells thereby causing only the remaining white cells to be counted. Included with the lysing agent is a potassium ferricyanide reagent. This reacts with the released hemoglobin of the red cells to form the cyanmethemoglobin complex and permits an optical colorimetric determination of the hemoglobin content of the blood. In a preferred configuration of the device the sample used for the hemoglobin measurement is contained in a beaker that can be shifted from the hemoglobin measuring position to the position for measuring the blood cell count.

The apparatus used is basically a cell counter of a type disclosed in the U.S. Pat. No. 2,656,508 to W. H. Coulter with features common to U.S. Pat. Nos. 2,869,078; 3,015,755; 3,557,162; 3,648,158 and 3,657,725 and improvements therein which facilitate avoidance of operational problems of the prior art while improving measurement, lowering manufacturing cost and adding an additional colorimetric determination.

For a better understanding of the present invention reference is made to accompanying drawings in which.

Figure 1:
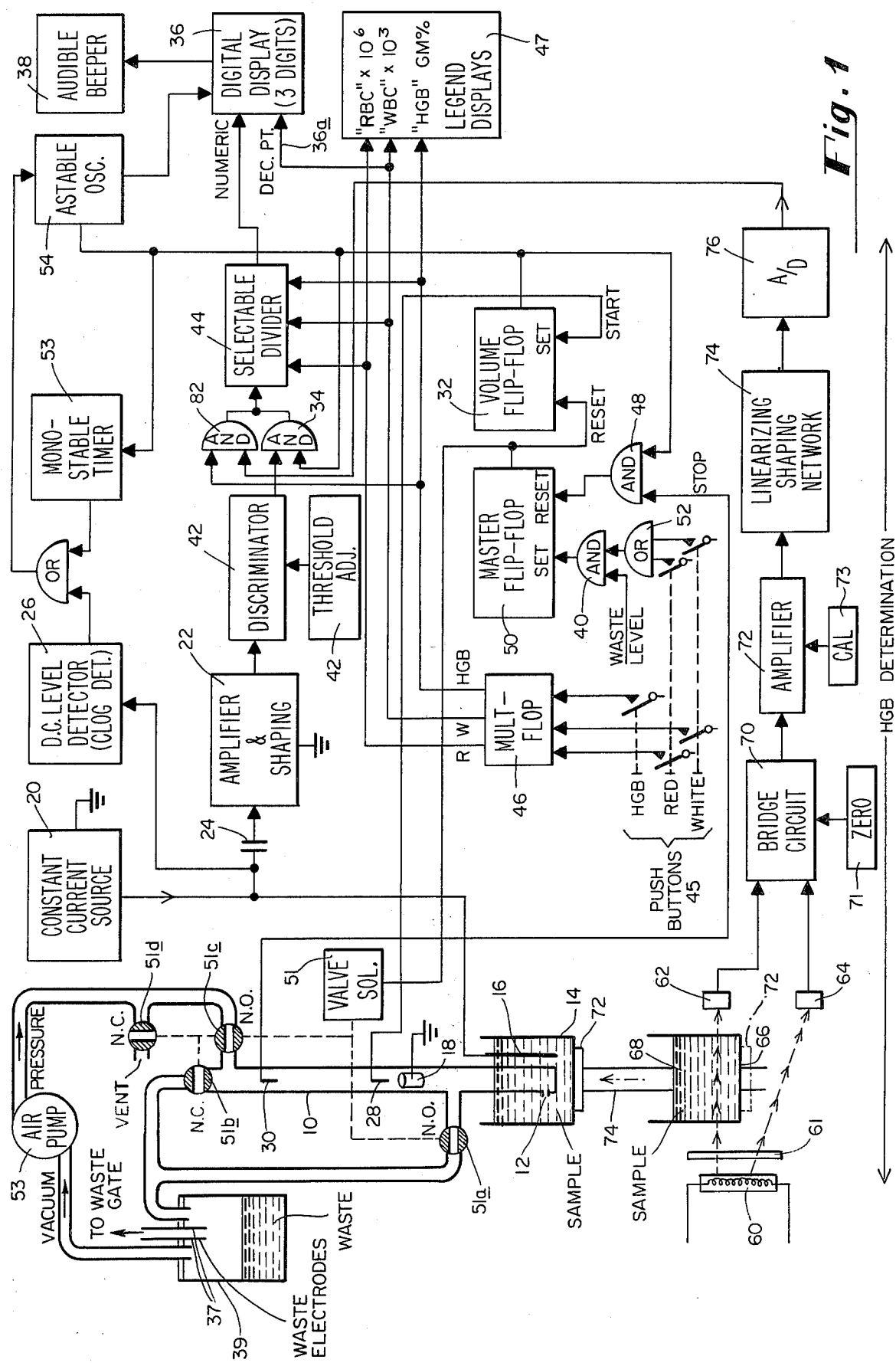
FIG. 1 is a block diagram of a preferred system in accordance with the present invention.

Referring to the block diagram of the apparatus, FIG. 1, there is illustrated a vertically oriented conductivity cell 10 which preferably is provided by a small bore of precise diameter within a transparent, insulating plastic housing. Near the bottom of the chamber, provided by the core, is a jeweled orifice 12 set into the cell side wall to limit the flow of fluid therethrough and to restrict the flow of particles therethrough to a succession of particles at a selected dilution. For applications involving red or white blood cells, the jeweled orifice has a diameter of the order of 100 microns. The use of such an orifice to permit individual cells to be counted is taught basically by Coulter U.S. Pat. No. 2,656,508. That patent also teaches the use of diluent to reduce the number of cells per unit volume so as to statistically reduce the frequency of cell passage through the orifice. Passage of any cells through the orifices may be dependent upon the orifice being immersed in a prepared diluted solution contained in a beaker 14. As in the prior art an electrode 16 is located outside the conductivity cell 10 and electrode 18 is within the conductivity cell 10. Electrode 16 is located outside of the column in position to lie within the beaker and extend into the solution when the beaker is placed in position for operation so that the orifice 12 lies below the surface of the liquid suspension thus enabling solution to flow through the orifice 12. The external electrode 16 may be supported on the outside wall of the conductivity cell or in any convenient position such that it will be immersed when the beaker is in position for flow to occur. Preferably, as shown in the drawings, the beaker 14 is placed on a platform 72 enabling it to be raised into operating position for cell counting, the position shown schematically in the diagram. As in the prior art, the cell count is accomplished by detecting voltage pulses. A constant current source 20 causes current flow between the electrodes 16 and 18. The pulses are caused by a change of conductivity in the electrolyte path between the electrodes as nonconductive cells successively partially restrict the orifice and reduce the cross sectional area of electrolyte conductor through which current flows.

In accordance with the present invention, electrode 18 within the chamber is grounded, whereas the electrode 16 outside the chamber is connected through a suitable conductive means to the current source 20, which is preferably a constant current source in accordance with the teaching of the present invention. The circuit through the electrodes and electrolyte is completed through suitable grounding of the constant current circuit. Voltage is monitored at a selected point in the circuit and detected pulses are amplified by amplifier 22 which may be capacitance coupled by capacitor 24, or otherwise coupled, to the selected point to detect such pulses as occur. As a special feature in accordance with the present invention since a constant current source is employed, a voltage sensitive detector circuit 26 may be used. Such a circuit senses the voltage change when an insulating particle, such as a blood cell passes through orifice 12 causing a voltage change between electrode 16 and grounded electrode 18, the two electrodes disposed on opposite sides of the orifice.

Sensing circuit 26 may be provided with the capability of detecting a predetermined abnormal voltage rise to initiate an alarm device such as a light, a buzzer, or in the preferred alarm indication means, an oscillator 54 that causes the output display 36 to flash on and off at a predetermined rate to attract the attention of the operator. A substantial voltage rise for a period of time frequently is due to clogging of orifice 12 or the passage of air through the orifice. Logic control may be provided whereby the previously mentioned oscillator 54 is only allowed to be started when the instrument is in a count mode of operation. An alternate input to the alarm device is provided by timer 53 which is initiated by volume flip flop 32. If timer 53 completes its time cycle before volume flip flop 32 is reset by contact electrode 30, via the master flip flop, then the oscillator 54 is triggered to cause the repetitive flashing on and off of display 36. Contrary to the prior art, such as U.S. Pat. No. 3,657,725, wherein volume measurements are made photoelectrically, or with the use of mercury manometer device described in U.S. Pat. No. 2,869,078, volume measurements are made in the system of the present invention electrically through electrodes, which cooperate with grounded electrode 18 so that electrode 18 performs a dual function. The disadvantages of prior volume measuring devices are related to high cost, delicate adjustments, and the use of potentially hazardous mercury, all of which are alleviated by the system of the present invention.

Preferably operation of the fluid cell occurs when a pump draws the liquid suspension through the orifice into the cell. The count to be taken is that count for a predetermined volume of fluid corresponding to that volume of fluid which lies between the respective bottoms of electrodes 28 and 30. Counting the cells as that volume is measured will give a count of the number of cells in that predetermined volume. That volume of the diluted suspension may be selected to be volume which corresponds to the standard unit volume for the count so that the actual count taken gives the number of cells per unit volume of whole blood, without conversion. If any other volume is selected, however, conversion to unit volume count is easily accomplished. In accordance with the present invention, the count which is recorded begins when the fluid rises within the conductivity cell 10 to a point that it contacts electrode 28. The count terminates after the fluid rises further still under the influence of the pump to a level that it contacts electrode 30. Each of these electrodes 28 and 30 has a circuit referenced to ground through the electrolyte and electrode 18. Until the electrolyte suspension rises to their respective levels, no current can flow between ground and that electrode, but when contact occurs with the electrolyte, current can flow and respective signals to start and stop the count are thus obtained.

A normal Red or White count sequence is as follows: The master flip flop 50 is set by the depression of either the red or white push buttons switches, of switch push button set 45. The setting of the master flip flop 50 releases or resets the volume flip flop 32 which can then be set by the fluid contacting electrode 28. The first contact of fluid will set volume flip flop 32 and subsequent bubbles or breaks in the column will have no effect. The volume flip flop is also protected against false triggering prior to the start of a count since it is held Reset by the master flip flop 50. Once the count is started it continues until the fluid column contacts the stop electrode 30. If this occurs while the count is in process the master flip flop 50 is reset thereby resetting the volume flip flop 32 and stopping the count. The signal from the stop electrode 30 is only accepted when the unit is in the count mode with volume flip flop 32 set so that a gating signal is applied to "and" gate 48. This interlocking technique eliminates improper sequencing of the machine.

The electrodes 28 and 30 are spaced apart vertically a precise distance, and the bore of the column 10 is formed to a precision diameter so that an accurate volume of test solution is drawn into the cavity during the count portion of the cycle after initiation of the count by the electrode 28 and termination of the count by the electrode 30.

During the count portion of the cycle, when the volume flip flop 32 is set the pulses representing the passage of cells through the orifice are amplified and shaped by conventional circuits 22. Then the voltage-sensitive threshhold discriminator 42 makes the decision whether each individual pulse is large enough to represent a blood cell. Those pulses which are large enough are sent to the selectable divider 44 via "and" gate 34 which is controlled by gate pulses when the volume flip flop 32 is set. Depending on which push button 45 is selected and how multi-flop 46 is set, the pulses are divided by 25 for a red count or 100 for a white count. During the count time, when volume flip flop 32 is set, the pulses at the output of the divider are sent to a counter and display conversion logic of the 3-digit display 36. The divide constants of 25 and 100 in accordance with the preferred embodiment are selected to correspond to the selected dilution ratio and selected count volume to give the desired display of number of cells per unit volume of whole blood. Other practical divide constants may be used. In any case conversion from the constant volume and known dilution to the specified count per standard volume unit is routine.

The control circuit of display 36 preferably also controls an audible device 38, such as a beeper or loudspeaker device. While the fluid level is between electrode 28 and electrode 30 after each predetermined group of cells in the measured volume is counted an audible beep is sounded. Such audible signals may be used to indicate to the user the start, stop, and normal cadence of a count.

Mode control is accomplished by a 3-state multi-flop 46. This device has 3 outputs, one for each state, Red, White or Hemoglobin. Multi-flop 46 is set in a selected state by the depressing of one of the input control switch push buttons 45. Its output controls the selectable dividers 44, (gate 82) and the legend display 47 and decimal point input 36a of the digital display 36.

When the level of the solution in the waste bottle reaches a predetermined level its electrolyte constituent completes a circuit between a pair of auxiliary electrodes 37 in the waste bottle 39. The completed circuit applies an inhibit signal to the reset terminal of the master flip flop 50 through a waste gate 40 similar to "and" gate 48. The inhibit signal terminates any subsequent counting until the waste bottle is emptied.

Also controlled by master flip flop 50 is electrically operated valve solenoid 51 which is energized at the initiation of the count by the operator depressing either the Red or White switch push buttons 45 to close either switch to activate "or" gate 52. Solenoid 51 is de-energized at the completion of the count as determined by electrode 30 through application of a stop signal to "and" gate 48 to reset master flip flop 50. When valve solenoid 51 is energized, it changes the condition of its four associated valves 51a, 51b, 51c and 51d, opening normally closed valve 51b and permitting vacuum pump 53 to draw fluid upward in the Column 10. Valves 51a and 51c are closed at this time. The vacuum causes the liquid level in the cell to rise until it contacts electrode 30 and releases valve solenoid 51. De-energization of solenoid 51 closes valve 51b so that the level no longer rises in Column 10. At the same time normally open valves 51a and 51c reopen and normally closed valve 51d which vents pressure from pump 53 recloses applying pressure to drain the solution to the level of the drain opening 52 through valve 51a to waste jar 39. The system is then ready for the next count. The air pump 53 employs suction and air pressure at the top of the cavity to displace the test solution level upward and downward in the column. Other liquid displacement means may be employed if desired.

Figure 3:
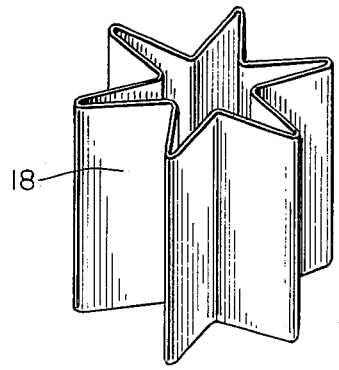
FIG. 3 is a perspective view of a preferred form of ground electrodes in accordance with the present invention.
Figure 4:
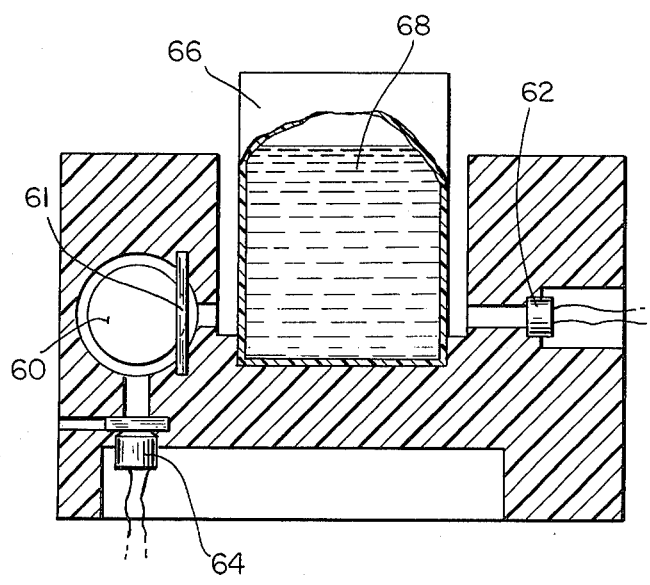
FIG. 4 is a vertical sectional view of an auxiliary optical comparitor in accordance with the present invention.
Figure 2:
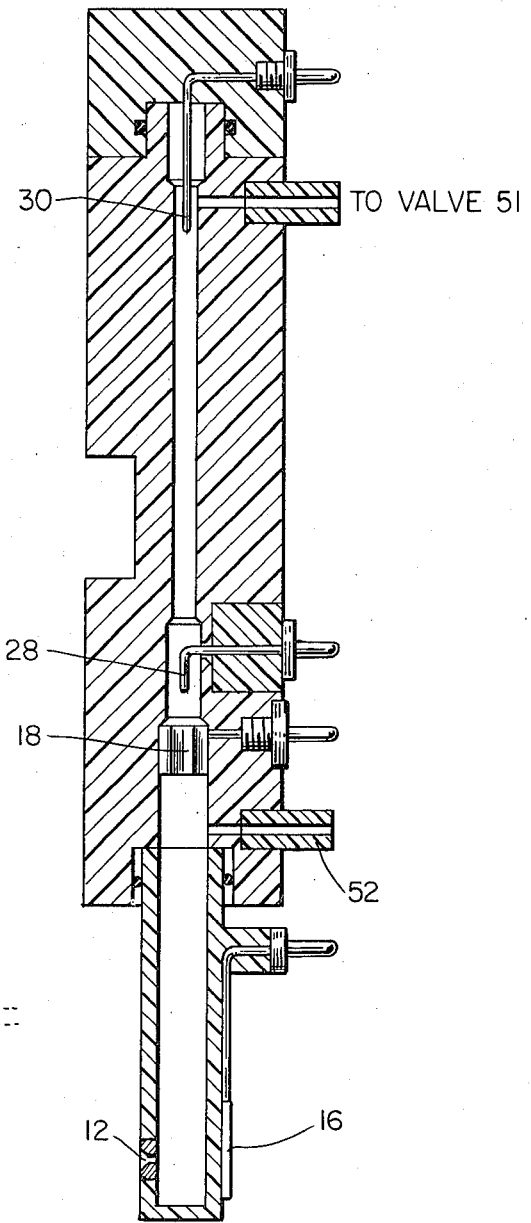
FIG. 2 is a vertical sectional view of a preferred conductivity cell in accordance with the present invention.

A preferred configuration of the electrode 18 is the corrugated tubular shape shown in FIG. 3 which provides a maximized surface area in the confined cross-sectional area of the core of the cell 10. The hollow shell configuration permits contact of the electrolyte with both sides of the electrode material of electrode 18, further increasing the effective surface area. An additional feature of the preferred electrodes 16, 18, 28 and 30 is the use of "platinum black" plating.

The part of the device used for the Hemoglobin determination is shown at the bottom of the block diagram, FIG. 1. In this test the Hemoglobin content of the red blood cells is measured by colorimetric means using the method commonly referred to as the cyanemethemoglobin method. In this technique a potassium ferricyanide reagent is included in the lysing agent to react with the released hemoglobin of the red cells to form the cyanmethemeglobin complex. This reaction results in a solution whose optical density at a light wavelength of 5,400 A is related to the Hemoglobin content of the sample.

The device operates by measuring the ratio of light detected by photocells 62 and 64. The light to these photocells comes from common light source 60 in combination with optical filter 61 which has a transmittance wavelength peaked at 5,400 A. Photocell 62 is located such that the light that reaches it first passes through the sample under test 68 which is contained in a transparent beaker 66 and hence is attenuated in proportion to the hemoglobin content of that sample. The light reaching photocell 64 by contrast, is not attenuated. The two photocells comprise two legs of a bridge circuit 70 which is provided with a zero adjustment 71. The bridge output is amplified by amplifier 72 whose gain is variable by calibration adjustment 73. The amplified signal is passed through shaping network 74 which provides an analog output signal that is directly proportioned to the hemoglobin content. This signal is then translated by analog-to-digital converter 76 to a form that can be used by the digital display 36 to read out to the operator the hemoglobin content in digital form properly scaled so as to read in common units such as "gm%" or "grams/100 cc."

In a preferred configuration of the system the transparent beaker 66 used for the hemoglobin determination is also used in place of the beaker 14 for the cell count. By means of a geometric arrangement whereby the counting cell 10 is located directly above the colorimetric Hemoglobin measurement position, a suitable elevator means 74 may be used to position the platform 72 at either the cell-counting level shown in full lines or at the hemoglobin-determination level shown in broken lines.

The embodiments of the invention in which an exclusive property or privelege is claimed are defined as follows:

1. A volumetric particle counter for counting relatively non-conductive particles in a fixed volume of relatively conductive liquid test solution comprising
a vertically oriented conductivity cell of insulating material having a metering orifice, an internal cavity providing a fixed volume between first and second levels within said cavity the volume between said first and second levels providing a measure of known volume of test solution, a suction connection on said cell communication with said cavity above the second level, a pressure connection on said cell communicating with said cavity above the second level, and a discharge passage from said cell communicating with said cavity below the first level,
a support frame for supporting said conductivity cell,
an open top beaker for containing a test solution containing particles to be counted, a platform movably supported on said support frame by elevator means to raise and lower said platform so that said beaker in the raised position places said test solution containing particles to be counted in fluid communication with said cell cavity through said orifice, vacuum producing means and gas pressure producing means on said support frame, separate valve means, respectively, connecting said suction connection to said vacuum producing means, connecting said pressure connection to said gas pressure producing means and connecting said discharge passage to waste, and each valve means having selectably positionable means for opening and closing said valve means, whereby the valve means connected to pressure and waste may be closed when the valve means connected to the vacuum producing means is opend to permit the test solution to be drawn into the internal cavity of the conductivity cell through the metering orifice and whereby these valve conditions may be simultaneously reversed to urge the test solution out to waste below the electrodes but above the orifice, an external electrode outside the conductivity cell in position to extend into the test solution in a container on said support means, an internal electrode inside the cavity of the conductivity cell, a counter circuit, into which said first internal and external electrodes are connected and which is completed by conductive liquid test solution between said electrodes, to count each pulse occurring as the result of variation in impedance of the circuit which occurs as a particle in the test solution passes through the orifice thereby reducing the conductive cross-section area of said orifice, first and second control electrodes positioned at said first and second levels within said cavity to sense when the test solution reaches, respectively, said first and second predetermined levels in said cavity, counter selection means connected to said first and second internal control electrodes and connected to the counter circuit to permit output of a selected count only when the test solution reaches said first level and terminating said selected count when the test solution reaches said second level, said selected count being representative of counted particles within said known volume, and count display means responsive to the output of the counter means and displaying a particle count proportioned to the count for said fixed volume.

2. The fixed volume particle counter of claim 1 in which a single pump simultaneously supplies both vacuum producing and gas pressure producing means which cooperate with said valve means and associated connections.

3. A counter according to claim 1 including waste electrodes in said reservoir to interrupt operation of said counter when said reservoir is filled up.

4. A counter according to claim 1 including optical comparator means to determine the optical density of the test solution.

5. A counter according to claim 4 including suitable switch means whereby said count display means may be selectively coupled to said output of said counter means or to said optical comparator means to display the counts or density respectively determined thereby.

6. A counter according to claim 5 wherein said comparator includes a bridge circuit, the output of which is coupled to said display unit by an analog-to-digital converter.

7. A counter according to claim 1 wherein said internal control electrodes are positioned at vertically-spaced positions in said cavity, the bore of said cavity having a precision diameter to accurately determine the volume drawn through the orifice during the operation of said counting means, said metering orifice comprising a jeweled orifice vertically oriented and set into the side wall of said cell.

8. A counter according to claim 1 including a display device for registering the count made by said counter means, a selecting switch means for identifying the character of the solution listed, and a selectable divider coupled to said selecting switch and said display device for calibrating the display device in accordance with the character of the solution tested.

9. A counter according to claim 1 wherein said counter circuit includes a constant-current source and a voltage-sensitive threshold discriminator to selectively pass only pulses of a proper level to represent particles of the desired size.

10. A counter according to claim 9 wherein said counter selection means includes a gate responsive to both said discriminator and said control electrodes to pass pulses to the counter means only when said test solution is rising from the first to the second internal control electrode.

11. A counter according to claim 1 wherein said internal control electrodes are connected separately to said counter selection means to complete a circuit including also one of said external and internal electrodes as a common circuit element in the conductive liquid test solution.

12. A counter according to claim 11 wherein said common circuit element consists of the internal electrode, said electrode being grounded.

13. A counter according to claim 1 wherein said internal electrode comprises a hollow shell of corrugated tubular shape.

14. A counter according to claim 1 wherein at least one of said electrodes comprises a "platinum black" plating on an electrode base material to provide extra surface area.

* * * * *